June 24, 1958   H. G. HAINES   2,840,314
HEATING SYSTEM
Filed April 28, 1953
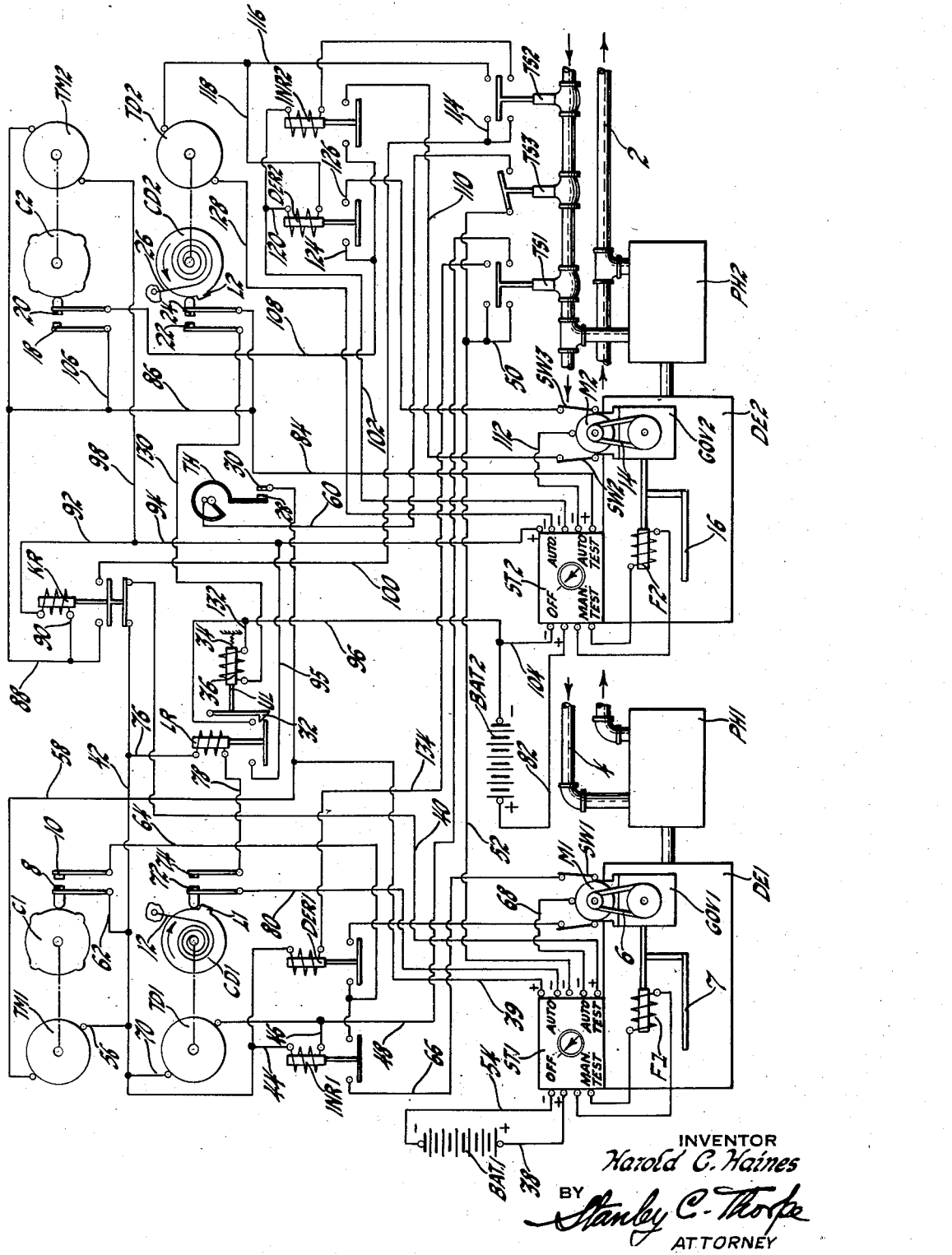
INVENTOR
Harold C. Haines
BY
Stanley C. Thorpe
ATTORNEY

United States Patent Office 2,840,314
Patented June 24, 1958

2,840,314

HEATING SYSTEM

Harold G. Haines, Birmingham, Mich., assignor to General Motors Corporation, Detroit, Mich., a corporation of Delaware Application April 28, 1953, Serial No. 351,681

15 Claims. (Cl. 237—8)

This invention relates to heating systems generally and more particularly to automatic thermostatically controlled space heating systems.

One of the greatest problems encountered in space heating systems, particularly those using an internal combustion engine as a main power source for heat generation, is automatic regulation of the system to maintain a substantially uniform predetermined temperature in the space to be heated in spite of adverse influences on the system such as pronounced outside temperature changes or other uncontrolled temperature influencing devices operating in or near the space to be heated.

It, therefore, becomes an object of this invention to provide a new and unique automatic control for an engine operated space heating system which will regulate the operation of the engine with great sensitivity and thereby maintain or adjust the temperature of the space heating system to operate within a satisfactory range when the system is subjected to uncontrolled adverse temperature influencing conditions.

It is a further object of this invention to provide a new and unique automatic control for a space heating system which will regulate the operation of a plurality of engines of the same general character with great sensitivity to thereby maintain or adjust the temperature of the space heating system to operate within a satisfactory range when the system is subjected to uncontrolled adverse temperature influencing conditions.

The manner in which these objects are accomplished will become apparent from the following description having reference to the drawing which shows a schematic diagram of an automatic thermostatic control for a space heating system in combination with one or more engine driven heat generators.

Referring now to the accompanying figure, heat circulating means for a space heating system are shown including the piping 2 and the piping 4 which allow heat carrying media to flow therethrough and carry heat to the space to be heated as shown by means of arrows on the diagram. Communicating with the piping 2 and 4 are a pair of power absorption units or heat generators PH1 and PH2 which receive the circulating heat carrying media from the pipe 4, transfer heat to the media and send the heated media back into the circulating means by means of pipe 2. The heat generators PH1 and PH2 may be of various types such as water brakes or other fluid agitating devices which, when driven at different speeds, generate different amounts of heat. In the example shown the heat generator PH1 is operatively connected to be driven by a diesel engine DE1 and the heat generator PH2 is operatively connected to be driven by a diesel engine DE2.

The diesel engine DE1 is provided with an automatic starting device ST1 which, when energized, will automatically start the diesel DE1 and bring it up to its minimum operating speed. Since the details of this automatic starting device ST1 do not form a part of this invention, no details are deemed necessary with respect to its description. If further information is desired concerning this automatic starting device, however, reference may be had to Patent No. 2,550,414, Haines, which describes and claims such an automatic engine starter in detail.

The diesel engine DE1 is also provided with a governor or speed regulator GOV1 which may be driven to increase or decrease engine speed by means of an electrical motor M1 and the belt and sheave assembly 6. The governor GOV1 when driven by the motor M1 moves the diesel engine fuel rack 7 to increase the speed of the engine or decrease its speed, depending upon the direction of rotation of the motor M1. A pair of relays INR1 and DER1 control the direction of rotation of the motor M1. The INR1 relay when energized sets up a circuit which when closed rotates motor M1 to increase the fuel rack setting whereas the DER1 relay when energized sets up a circuit which when closed rotates the motor M1 to decrease the fuel rack setting. Timing means including a timing motor TM1 having a lobed cam C1 suitably coupled thereto is provided to periodically energize the motor M1 to either increase the fuel rack setting or decrease it, depending on whether the INR1 relay or the DER1 relay is energized. When the motor TM1 runs continuously the cam C1 causes the contacts 8 and 10 to make every so often for a very short period. This making and breaking of contacts 8 and 10 intermittently energizes the motor M1 to cause incremental changes in diesel engine speed. The reason for having relatively long breaks between relatively short makes is to give the temperature sensitive means of the system a chance to sense any temperature change which may be caused by the incremental changes in engine speed. Adapted to operate in relation with the timing means just described is a time delay means which includes a motor TD1 having a cam CD1 suitably coupled thereto. Formed on the cam CD1 is a lobe L1 which serves to make the contacts 72 and 74 when cam CD1 has been rotated clockwise a sufficient amount. It may be noted that the cam CD1 is biased by means of a spring 12 which automatically resets the cam to the position shown, whenever the motor TD1 is deenergized. The motor TD1 is usually energized whenever motor TM1 is energized and if after engine DE1 is brought up to maximum operating speed the temperature of the system still is too low, the contacts 72 and 74 will be closed to start engine DE2 in a manner to be described in more detail later. A battery BAT1 serves as an energizing source for the automatic starter ST1, the operating coils of the INR1 and DER1 relays, and the motors M1, TM1 and TD1 when connected in electrical circuit therewith.

Referring now to the right-hand side of the diagram, the diesel engine DE2 is also provided with a similar governor GOV2 which is connected to a motor M2 by means of a belt and sheave assembly 14. Driving of the governor GOV2 by means of the motor M2 moves the fuel rack 16 of diesel engine DE2 to either increase or decrease engine speed, depending on the direction of rotation of motor M2. Diesel engine DE2 is also provided with an automatic starting means ST2 which is similar to the automatic starting means ST1. Likewise a pair of relays INR2 and DER2 are provided which when energized determine the direction of rotation of the motor M2. The relay INR2 when energized sets up a circuit which when closed rotates motor M2 to increase the setting of fuel rack 16 and the DER2 relay when energized sets up a circuit which when closed rotates the motor M2 to decrease the fuel rack setting.

A timing means is also provided for diesel engine DE2 and includes the motor TM2 having a lobed cam C2 suitably coupled thereto. Cam C2 is similar to cam C1 and operates to periodically close contacts 18 and 20 thereby causing incremental changes in the speed of engine DE2. Adapted to operate in relation with the timing means just described is a second time delay means including motor TD2 having a cam CD2 coupled thereto. The cam CD2 is provided with a lobe L2 which after a predetermined period of continuous energization of the motor TD2 closes contacts 22 and 24. The cam CD2 is provided with a spring 26 which serves to reset the cam CD2 to the position shown whenever the motor is deenergized. The motor TD2 and cam CD2 act to stop engine DE2 after it has been running at its minimum operating speed for a predetermined period in a manner to be described in more detail later.

A room thermostate TH is provided having a pair of contacts 28 and 30 which are set to open when room temperature is a certain number of degrees above desired room temperature. Opening of contacts 28 and 30 shuts down engine DE1. A second battery BAT2 serves as an energizing source for the automatic starter ST2, the operating coils of the INR2 and DER2 relays, and motors M2, TM2 and TD2 when connected in electrical circuit therewith.

In order to connect the electrical control for diesel engine DE1 to the operating controls for engine DE2 a lock-up relay LR is provided which when energized has its interlock maintained closed by means of a lock 32 normally biased by a spring 34 acting against the armature 36 of an unlocking relay UL. The unlocking relay UL when energized acts against the spring 34 to move the lock 32 from beneath the interlock of the LR relay so that this interlock drops open when the LR relay is deenergized. A relay KR is also provided which when energized serves to prevent further energization of motors M1, TM1 and TD1. Energization of relay KR also sets up circuits for energizing relays INR2, DER2 and motor TD2.

Referring now to the lower right-hand portion of the diagram a temperature sensitive switch TS1 is shown connected to the cooling media return line 4 of the circulating means. This switch TS1 has a lower interlock which is closed when the temperature of the cooling media in the return line of the circulating means is at or below a predetermined minimum temperature. The upper interlock of the switch TS1 closes when the return line temperature of the circulating means is at or above a predetermined maximum temperature. A second temperature sensitive switch TS2 which is also connected in the return line 4 of the circulating means is provided with a lower interlock which closes at or below the same minimum predetermined temperature which closes the lower interlock of switch TS1. Similarly the upper interlock of switch TS2 closes at or above a maximum predetermined temperature which is the same as the maximum predetermined temperature for closing the upper interlock of switch TS1. Located between the two switches TS1 and TS2 and also connected in the return line 4 of the circulating means is a temperature sensitive switch TS3. Switch TS3 is provided with an interlock which closes below the minimum predetermined temperature at which the lower interlocks of switches TS1 and TS2 close. The interlock of switch TS3 will remain closed until the temperature in the return line 4 reaches a predetermined temperature which is above the maximum predetermined temperature at which the upper interlocks of switches TS1 and TS2 close.

Operation of this automatic thermostatically controlled heating system is as follows:

Assume for a moment that both engines are stopped and that the temperature of the cooling media in the pipe 4 is at or below the minimum predetermined temperature at which the lower interlocks of switches TS1 and TS2 close, but above the minimum temperature at which the interlock of switch TS3 opens. In other words, with the conditions assumed the lower interlocks of switches TS1 and TS2 will be closed and the interlock of switch TS3 will also be closed. Now, if it is desired to bring the temperature of the system up into the desirable operating range, the dials of the automatic starters ST1 and ST2 should be placed in the automatic position. With the dial of the automatic starter ST1 in the automatic position and with the lower interlocks of switches TS1 and TS2 as well as the interlock TS3 closed, current may flow from the positive side of the battery BAT1, through a conductor 38 to a positive terminal on the automatic starter ST1. After the current enters the automatic starter ST1 it branches into two circuits, one of which includes the automatic starting means for starting diesel engine DE1, and the upper positive terminal on the right-hand side of starter ST1, a conductor 39, a conductor 58, the closed contacts 28 and 30 of room thermostat TH, a conductor 60, the closed interlock of switch TS3 and a conductor 52 connected to a negative terminal on the automatic starter ST1 which returns by means of a conductor 54 to the negative side of the battery BAT1. This last described circuit serves to start diesel engine DE1 and bring it up to minimum operating speed. (It will be noted that a solenoid F1 is provided on the fuel rack 7 and is controlled by the automatic starting means to move the rack 7 to the proper speed and load setting desired for prompt starting as explained in Haines Patent No. 2,550,414.) The other branch of the circuit in the starter ST1 connects the upper positive terminal on the left-hand side of the starter ST1 to the lower positive terminal on the right-hand side of starter ST1 so that current may flow through a conductor 40, the normally closed interlock of the relay KR, a conductor 42, a conductor 44, the operating coil of the relay INR1, a conductor 46, a conductor 48, the now closed lower interlock of switch TS1, a conductor 50, a conductor 52 to a negative terminal on the automatic starter ST1 which returns by means of a conductor 54 to the negative side of the battery BAT1. With the engine started and its dial on automatic and the lower interlocks of switches TS1, TS2 and the interlock of TS3 closed, current may also flow from the opposite side of the battery BAT1 through conductor 38, automatic starter ST1, the conductor 40, the normally closed interlock of the relay KR, the conductor 42, a conductor 56, the motor TM1, a conductor 58, the closed contacts of the room temperature thermostat TH, a conductor 60, the now closed interlock of the temperature switch TS3 and the conductor 52 returning to a negative terminal on the automatic starter ST1 which returns by the conductor 54 to the negative side of the battery BAT1. This last mentioned circuit energizes the motor TM1 to turn the cam C1 to periodically close the contacts 8 and 10. These contacts, as explained, normally remain open for an extended period and are only closed for a very short time to briefly energize the motor M1 to move the fuel rack a slight amount. Closure of the contacts 8 and 10 by means of the lobes on cam C1 allows current to flow from the positive side of the battery BAT1, through the conductor 38, the automatic starter ST1, the conductor 40, the normally closed interlock of relay KR, the conductor 42, a conductor 62, the closed contacts 8 and 10, a conductor 64, the now closed interlock of the increase relay INR1, a conductor 66, a switch SW1 connecting one side of the motor M1 to conductor 66, through the motor M1, through a conductor 68 connected to a negative terminal on the automatic starter ST1 which returns by means of the conductor 54 to the negative side of the battery BAT1. The circuit just traced out starts the motor M1 which moves the fuel rack 7 a small amount to slightly increase the speed of diesel engine DE1. As soon as the contacts 8 and 10 are opened the speed of engine DE1 will become constant so that temperature switch TS1 and TS2 can sense any temperature change caused by the increase in engine speed. This periodic speed increase of the engine DE1 will continue until the media in return line 4 reaches a temperature above the minimum predetermined temperature at which the lower interlock of switch TS1 closes or until diesel engine DE1 reaches its maximum speed. If the temperature of the media in the return line 4 does not reach the predetermined minimum temperature at which the lower interlock of switch TS1 opens after the speed of engine DE1 reaches its operating maximum, diesel engine DE2 will be started. Diesel engine DE2 is started in the following way:

At the same time that the motor TM1 and the operating coil of relay INR1 are energized the motor TD1 is also energized. Motor TD1 is energized by means of current flowing from the positive side of the battery BAT1, through conductor 38, the automatic starter ST1, the conductor 40, the normally closed interlock of relay KR, the conductor 42, a conductor 70, motor TD1, the conductor 48, the now closed lower interlock of switch TS1, the conductor 50, the conductor 52 connected to a negative terminal on the automatic starter ST1 which leads by means of conductor 54 to the negative side of the battery BAT1. Energization of motor TD1 along with motor TM1 causes the cam CD1 to rotate clockwise against action of the spring 12. If the motor TD1 is continuously energized for a predetermined period of time (the time required to bring the speed of the engine DE1 from a minimum up to its maximum operating speed by means of timing motor TM1) the lobe L1 will close the contacts 72 and 74. Closure of contacts 72 and 74 serve to complete a circuit which will energize the operating coil of the relay LR. The coil of relay LR will be energized by current flowing from the positive side of the battery BAT1, through conductor 38, the automatic starter ST1, the conductor 40, the normally closed interlock of relay KR, a conductor 76, the operating coil of relay LR, a conductor 78, the closed contacts 72 and 74, a conductor 80 connected to a negative terminal on the automatic starter ST1 which returns by means of conductor 54 to the negative side of the battery BAT1. Energization of the operating coil of relay LR closes its interlock which, as explained, is maintained closed by the lock 32. Closure of the interlock of relay LR allows current to flow through the automatic starting means of automatic starter ST2 to thereby start diesel engine DE2. Closure of the interlock of relay LR also allows current to flow through the operating coil of the relay KR. The current which energizes the automatic starting means of the automatic starter ST2 flows from the positive side of the battery BAT2 through a conductor 82 to the positive terminal on the left-hand side of automatic starter ST2 from where it flows through the automatic starting means to the positive terminal on the upper right-hand side of automatic starter ST2. The current then flows through a conductor 94, a conductor 95, the now closed interlock of the relay LR, and a conductor 96 returning to the negative side of the battery BAT2. This last mentioned circuit along with the fuel rack adjusting solenoid F2 will start diesel engine DE2 and bring it up to its minimum operating speed. The circuit energizing the coil of relay KR includes the positive side of the battery BAT2, the conductor 82, the positive terminal on the left-hand side of the automatic starter ST2 which leads to the lower positive terminal on the right-hand side of starter ST2, a conductor 84, a conductor 86, a conductor 88, a conductor 90, the operating coil of relay KR, a conductor 92, the conductor 94, conductor 95, the now closed and locked interlock of relay LR and the conductor 96 returning to the negative side of the battery BAT2. Energization of the operating coil of relay KR will cause closure of its upper interlock and opening of its lower interlock. Since the lower interlock of relay KR is in series with the battery BAT1 and must be passed through before current can flow through the motors TM1 and TD1 as well as the operating coils of relays INR1 and LR, opening of the lower interlock of relay KR will deenergize motors TM1 and TD1 as well as the operating coils of relays INR1 and LR. Deenergization of these two motors and relays will allow diesel engine DE1 to continue to operate at its maximum speed.

Closure of the interlock of the relay LR when the lower interlock of switch TS2 is closed also serves to energize the motor TM2. The circuit for energizing the motor TM2 includes the positive side of the battery BAT2, the conductor 82, the automatic starter ST2, conductors 84, 86 and 88, motor TM2, a conductor 98, conductors 94 and 95, locked interlock of relay LR and the conductor 96 returning to the negative side of the battery BAT2. Since the upper interlock of the relay KR is now closed, the operating coil of the relay INR2 will also be energized by means of current flowing from the positive side of the battery BAT2, through the conductor 82, the automatic starter ST2, conductors 84, 86 and 88, the now closed upper interlock of relay KR, a conductor 100, the closed lower interlock of temperature switch TS2, the operating coil of relay INR2, and a conductor 102 connected to a negative terminal on the automatic starter ST2 which returns to the negative side of the battery BAT2 by means of a conductor 104 and the conductor 96. Energization of the relay INR2 closes its interlock and sets up the circuit for energizing the motor M2 to increase the speed of diesel engine DE2 when the contacts 18 and 20 are closed by means of the lobes on the cam C2. The cam C2 operates in a manner similar to that of the cam C1 which operation has already been explained. When the contacts 18 and 20 are closed by means of the lobes on the cam C2 current is allowed to flow through the governor motor M2 by means of a circuit including the positive side of the battery BAT2, the conductor 82, the automatic starter ST2, the conductors 84 and 86, a conductor 106, the contacts 18 and 20, a conductor 108, the now closed interlock of relay INR2, a conductor 110, a switch SW2 connecting one side of the motor M2 to the conductor 110, the motor M2, and a conductor 112 connected to a negative terminal on the automatic starter ST2 which returns by means of conductors 104 and 96 to the negative side of the battery BAT2. As already stated, a periodic number of operations of the motor M2 will increase the speed of diesel engine DE2 until the lower interlocks of switches TS1 and TS2 open when the temperature of the media in the return line 4 rises above the minimum predetermined temperature at which it is desired to have the system operate. Opening of the lower interlock of switch TS2 will deenergize the relay INR2 and prevent any further increase in the speed of diesel engine DE2. The system will then continue to operate with engine DE1 turning at maximum speed and with diesel engine DE2 operating at the speed which tends to maintain the interlocks of temperature sensitive switches TS1 and TS2 open.

Now, for some reason such as a rise in outside temperature, the temperature of the system may rise above the maximum predetermined temperature at which the upper interlocks of switches TS1 and TS2 close. Closure of the upper interlock of switch TS2 serves to energize the motor TD2 and the operating coil of the relay DER2. Coil DER2 is energized by means of current flowing from the positive side of the battery BAT2, through the conductor 82, the automatic starter ST2, the conductors 84, 86 and 88, the now closed upper interlock of relay KR, the conductor 100, a conductor 114, the now closed upper interlock of the switch TS2, a conductor 116, a conductor 118, the operating coil of the relay DER2, a conductor 120, and a conductor 102 connected to a negative terminal on the automatic starter ST2 which returns by means of the conductors 104 and 96 to the negative side of the battery BAT2. Energization of the operating coil of the relay DER2 causes this interlock to close to thereby set up a circuit including the contacts 18 and 20 to periodically energize the motor M2 to decrease the speed of diesel engine DE2. Periodic energization of the motor M2 is accomplished by current flowing from the positive side of the battery BAT2 through the conductor 82, the automatic starter ST2, the conductors 84, 86 and 106, the contacts 18 and 20, the conductor 108, a conductor 124, the now closed interlock of relay DER2, a conductor 126, a switch SW3 connecting one side of the motor M2 to the conductor 126, the motor M2, the conductor 112 connected to a negative terminal on the automatic starter ST2 which returns by means of conductors 104 and 96 to the negative side of the battery BAT2. Also energized by closure of the upper interlock of the temperature switch TS2 is the motor TD2. Energization of the motor TD2 is accomplished by current flowing from the positive side of the battery BAT2, through the conductor 82, the automatic starter ST2, the conductors 84, 86 and 88, the now closed upper interlock of the relay KR, the conductors 100 and 114, the now closed upper interlock of switch TS2, the conductor 116, the motor TD2 and a conductor 128 connected to a negative terminal on the automatic starter ST2 which returns by means of conductors 104 and 96 to the negative side of the battery BAT2. Energization of the motor TD2 rotates the cam CD2 counterclockwise against action of the spring 26. If the motor TD2 should be continuously energized for a predetermined period, that is until the lobe L2 causes the contacts 22 and 24 to close it is assumed that diesel engine DE2 is no longer needed to maintain the temperature within the proper range and the contacts 22 and 24 will act to stop diesel engine DE2, and disconnects motors M2, TM2 and TD2 as well as the operating coils of relays INR2 and DER2 from the battery BAT2. This is accomplished in the following manner:

When the contacts 22 and 24 are closed by means of lobe L2 on cam CD2 current is allowed to flow from the positive side of the battery BAT2, through the conductor 82, the automatic starter ST2, the conductor 84, the contacts 24 and 22, a conductor 130, the operating coil of the relay UL, a conductor 132, and the conductor 96 returning to the negative side of the battery BAT2. Energization of the operating coil of the relay UL causes the armature of relay UL to move against the action of the spring 34 thereby releasing the lock 32 which allows the interlock of the deenergized relay LR to open. Since the open interlock of relay LR is in series with the battery BAT2 and the operating coil of the relay KR, relay KR will be deenergized to open its upper interlock and close its lower interlock. Opening of the upper interlock of relay KR prevents further energization of the increase or decrease relays INR2 and DER2 and also serves to deenergize motor TD2. Since the open interlock of relay LR is also in series with the battery BAT2 and the motor TM2 the motor TM2 will be deenergized. Closure of the lower interlock of the relay KR will again energize motor TM1 as long as the interlock of the switch TS3 remains closed. Motor TM1 is energized by means of current flowing from the positive side of the battery BAT1 through the conductor 38, the automatic starter ST1, conductor 40, the now normally closed lower interlock of the relay KR, the conductors 42 and 56, the motor TM1, the conductor 58, the closed contacts of room thermostat TH, the conductor 60, the closed interlock of switch TS3 and conductor 52 connected to the negative terminal on the automatic starter TS1 which returns by means of conductor 54 to the negative side of the battery BAT1. With the upper interlock of the temperature switch TS1 now closed current may also flow through the operating coil of the relay DER1. The coil of relay DER1 is energized by current flowing from the negative side of the battery BAT1 through conductor 38, the automatic starter ST1, conductor 40, the now normally closed lower interlock of relay KR, conductor 42, the operating coil of relay coil DER1, a conductor 134, the closed upper interlock of switch TS1, the conductor 50, the conductor 52 connected to a negative terminal on the automatic starter ST1 which returns by means of conductor 54 to the negative side of the battery BAT1. When the operating coil of relay DER1 is energized it causes the interlock of relay DER1 to close thereby setting up a circuit including the contacts 8 and 10 which, when periodically closed, serve to complete a circuit energizing the motor M1 to reduce the speed of diesel engine DE1. As long as the upper interlock of temperture switch TS1 remains closed relay DER1 will remain energized to periodically decrease the speed of the engine DE1. When the speed of engine DE1 is reduced sufficiently to cause opening of the upper interlock of temperature switch TS1, the operating coil of relay DER1 will be deenergized to prevent any further reduction in the speed of diesel engine DE1.

If the upper interlock of temperature switch TS1 remains closed after the speed of diesel engine DE1 has been reduced to its minimum operating speed and the temperature of the system continues to rise the interlock of temperature switch TS3 will finally open. Opening of the interlock of switch TS3 opens the circuit through the starter ST1 which includes the automatic starting means for engine DE1. Opening the circuit including the automatic starting means of automatic starter ST1 deenergizes the automatic starting means and shuts down engine DE1.

Complete operation of this new, unique thermostatic control has been described for extreme temperature variations. It should be appreciated, however, that if extraneous temperature influences are fairly uniform, the fuel rack setting of the engines may vary between perhaps only two positions over long periods of time. If, however, the extraneous temperatures become more variable, the control will exercise an increased amount of regulation and so on. It should also be mentioned that the control can be made to regulate the system temperature with almost any degree of sensitivity depending upon the temperatures which are selected to close the upper and lower interlocks of switches TS1 and TS2. If the difference between these two temperatures is relatively small the control will be very sensitive. If, however, the difference in temperatures is great the control will be less sensitive.

I claim:

1. An automatic thermostatically controlled heating system comprising a heat generator, an engine connected to drive said heat generator, heat circulating means connected to said heat generator, a speed regulator connected to said engine, timing means connected to said regulator to periodically increase and decrease engine speed, and temperature sensitive means connected to said heat circulating means and said timing means, said temperature sensitive means being responsive to temperatures in said heat circulating means below a predetermined temperature to start said timing means, said timing means when started acting to periodically increase engine speed, said temperature sensitive means being responsive to temperatures in said heat circulating means above a predetermined temperature to start said timing means, said timing means when started acting to periodically decrease engine speed.

2. An automatic thermostatically controlled heating system comprising heat generating means, an engine connected to drive said heat generating means, heat circulating means connected to said generating means, speed regulating means connected to said engine and including an engine governor and an electric motor connected to said governor, timing means including periodically operable make and break contacts, means to make and break said contacts, a voltage source, and temperature sensitive switching means connected between said voltage source and said motor and in series electrical circuit with said contacts, said temperature sensitive switching means being responsive to temperatures in said heat circulating means below and above a predetermnied temperature to energize said means to make and break said contacts and to connect said motor to said voltage source and periodically vary the speed of said engine.

3. An automatic thermostatically controlled heating system comprising heat generating means, an engine connected to drive said heat generating means, heat circulating means connected to said heat generating means, speed regulating means connected to said engine and including an engine governor and a reversible electric motor connected to said governor, timing means including periodically operable make and break contacts, means to make and break said contacts, a voltage source, and temperature sensitive switching means connected between said voltage source and said motor and in series electrical circuit with said contacts, said temperature sensitive switching means being responsive to temperatures in said heat circulating means below and above a predetermined temperature to energize said means to make and break said contacts and to reversibly connect said motor to said voltage source and periodically vary the speed of said engine.

4. An automatic thermostatically controlled heating system comprising heat generating means, a engine connected to drive said heat generating means, heat circulating means connected to said heat generating means, speed regulating means connected to said engine and including an engine governor and a first electric motor connected to said governor, a voltage source, timing means including periodically operable make and break contacts, a second electric motor connected to means to make and break said contacts and connected in electrical circuit with said voltage source, and temperature sensitive switching means connected between said voltage source and said first motor and in series electrical circuit with said contacts, said temperature sensitive switching means also being connected between said second motor and said voltage source, said temperature sensitive switching means being responsive to temperatures in said heat circulating means below and above a predetermined temperature to connect said first and second motors to said voltage source and periodically vary the speed of said engine.

5. An automatic thermostatically controlled heating system comprising heat generating means, an engine connected to drive said heat generating means, heat circulating means conected to said heat generating means, starting means connected to said engine, a speed regulator connected to said engine, timing means connected to said regulator to periodically increase engine speed, and temperature sensitive means connected to said heat circulating means and said starting means and responsive to temperatures in said heat circulating means below a predetermined temperature to start said engine, said temperature sensitive means being connected to said timing means and responsive to temperatures in said heat circulating means below a predetermined temperature to energize said timing means and periodically increase engine speed.

6. An automatic thermostatically controlled heating system comprising heat generating means, an engine connected to drive said heat generating means, heat circulating means connected to said heat generating means, speed regulating means connected to said engine, timing means connected to said engine to periodically increase and decrease engine speed, starting means connected to said engine, a voltage source, and temperature sensitive switching means connected to said heat circulating means and in series electrical circuit with said starting means and said voltage source, said temperature sensitive switching means being responsive to temperatures in said heat circulating means below a predetermined temperature to connect said starting means to said voltage source, said temperature sensitive means being connected to said timing means and responsive to temperatures in said heat circulating means below and above a predetermined temperature to energize said timing means and periodically increase and decerase engine speed.

7. An automatic thermostatically controlled heating system comprising heat geenrating means, an engine connected to drive said heat generating means, heat circulating means connected to said heat generating means, speed regulating means connected to said engine and including an engine governor and a reversible electric motor connected to said governor, starting means connected to said engine, timing means including periodically operable make and break contacts, means to make and break said contacts, a voltage source, and temperature sensitive switching means connected to said heat circulating means and connected in series electrical circuit with said voltage source and said starting means, said temperature sensitive switching means being responsive to temperatures in said heat circulating means below a predetermined temperature to connect said starting means to said voltage source and start said engine, said temperature sensitive switching means being responsive to temperatures below and above said predetermined temperature to energize said means to make and break said contacts, said temperature sensitive switching means being connected between said voltage source and said motor and responsive to temperatures in said heat circulating means below and above said predetermined temperature to periodically vary the speed of said engine.

8. An automatic thermostatically controlled heating system comprising heat generating means, an engine connected to drive said heat generating means, heat circulating means connected to said heat generating means, a speed regulator connected to said engine, timing means connected to said regulator to periodically increase and decrease engine speed, stopping means connected to said engine, and temperature sensitive means connected to said heat circulating means and said timing means and responsive to temperatures in said heat circulating means above a predetermined temperature to energize said timing means and periodically decrease engine speed, said temperature sensitive means being connected to said stopping means and responsive to temperatures in said heat circulating means above a predetermined temperature to stop said engine.

9. An automatic thermostatically controlled heating system comprising a heat generator, an engine connected to drive said heat generator, circulating means connected to said heat generator, a speed regulator connected to said engine, starting and stopping means connected to said engine, timing means connected to said regulator to periodically increase and decrease engine speed, first temperature sensitive means connected to said heat circulating means and said timing means and said starting means and responsive to temperatures in said circulating means below a predetermined temperature to start said engine and said timing means and periodically increase engine speed, and second temperature sensitive means connected to said heat circulating means and said timing means and said stopping means and responsive to temperature in said circulating means above a predetermined temperature to energize said timing means and periodically decrease engine speed and stop said engine.

10. An automatic thermostatically controlled heating system comprising a first heat generator and a second heat generator, heat circulating means connected to said heat generators, a first engine connected to said first heat generator, a second engine connected to said second heat generator, a first speed regulator connected to said first engine, a second speed regulator connected to said second engine, temperature sensitive means connected to said heat circulating means and said first speed regulator and responsive to temperatures in said heat circulating means below a predetermined first temperature to increase said first engine speed, starting means connected to said second engine, and timing means connected to said first speed regulator and said starting means and responsive to a period of predetermined constant speed operation of said first engine to start said second engine, said temperature sensitive means being connected to said second speed regulator and responsive to temperatures in said heat circulating means below a predetermined temperature to increase said second engine speed.

11. An automatic thermostatically controlled heating system comprising a first heat generator and a second heat generator, heat circulating means connected to said heat generators, a first engine connected to said first heat generator, a second engine connected to said second heat generator, a first speed regulator connected to said first engine, a second speed regulator connected to said second engine, temperature sensitive means connected to said heat circulating means and said first speed regulator and responsive to temperatures in said heat regulating means above a predetermined temperature to increase said first engine speed, starting and stopping means connected to said second engine, first timing means connected to said first speed regulator and said starting means and responsive to a period of predetermined constant speed operation of said first engine to start said second engine, said temperature sensitive means being connected to said second speed regulator and responsive to temperatures in said heat circulating means below and above said predetermined temperature to increase and decrease said second engine speed, and second timing means connected to said second speed regulator and said stopping means and responsive to a period of predetermined constant speed operation of said second engine at temperatures in said heat circulating means above said predetermined temperature to stop said second engine.

12. An automatic thermostatically controlled heating system comprising a first heat generator and a second heat generator, heat circulating means connected to said first heat generator and said second heat generator, a first engine connected to said first heat generator, a first speed regulator connected to said first engine, a second engine connected to said second heat generator, a second speed regulator connected to said second engine, a first timing means connected to said first regulator to periodically increase and decrease said first engine speed, temperature sensitive means connected to said heat circulating means and said first timing means and responsive to temperatures in said heat circulating means below a predetermined temperature to periodically increase said first engine speed, a second timing means connected to said second regulator to periodically increase and decrease said second engine speed, starting means connected to said second engine, a third timing means connected to said first timing means and said starting means and respossive to a predetermined period of operation of said first timing means to start said second engine, said temperature sensitive means being connected to said second timing means and responsive to temperatures in said heat circulating means below said predetermined temperature to periodically increase said second engine speed.

13. An automatic thermostatically controlled heating system comprising a first heat generator and a second heat generator, heat circulating means connected to said heat generators, a first engine connected to said first heat generator, a second engine connected to said second generator, a first speed regulator connected to said first engine, starting and stopping means connected to said first engine, a first timing means connected to said first regulator to periodically increase and decrease said first engine speed, temperature sensitive means connected to said heat circulating means and said starting means and responsive to temperatures in said heat circulating means below a predetermined temperature to start said engine, said temperature sensitive means being connected to said first timing means and responsive to temperatures in said circulating means below said predetermined temperature to periodically increase said first engine speed, said temperature sensitive means being responsive to temperatures in said heat circulating means above said predetermined temperature to periodically decrease said first engine speed, said temperature sensitive means being connected to said stopping means and responsive to temperatures in said heat circulating means above said predetermined temperature to stop said first engine, a second timing means connected to said second regulator to periodically increase and decrease said second engine speed, a second starting and stopping means connected to said second engine, a third timing means connected to said second starting means and said first timing means and responsive to a predetermined period of operation of said first timing means to start said second engine, said temperature sensitive means being connected to said second timing means and responsive to temperatures in said circulating means below said predetermined temperature to periodically increase said second engine speed, said temperature sensitive means being responsive to temperatures in said heat circulating means above said predetermined temperature to decrease said second engine speed, and fourth timing means connected to said second timing means and said second stopping means and responsive to a predetermined period of operation of said second timing means at temperatures in said heat circulating means above said predetermined temperature to stop said second engine.

14. An automatic thermostatically controlled heating system comprising heat generating means, heat circulating means connected to said heat generating means, a first driving engine connected to drive a portion of said heat generating means, a second driving engine connected to drive another portion of said heat generating means, a speed regulator connected to said second engine, starting means connected to said second engine, timing means connected to said first engine and said starting means and responsive to a period of predetermined constant speed operation of said first engine to start said second engine, and temperature sensitive means connected to said speed regulator and responsive to temperatures in said heat circulating means below a predetermined temperature to increase said second engine speed.

15. An automatically controlled power-generating system comprising power-generating means, power-transmitting means connected to a portion of said power-generating means, a first driving engine connected to drive said portion of power-generating means, a second driving engine connected to drive another portion of said power-generating means, a speed regulator connected to said second engine, starting means connected to said second engine, timing means connected to said first engine and said starting means and responsive to a period of predetermined constant speed operation of said first engine to start said second engine, and load-sensitive means connected to said speed regulator and responsive to a predetermined load on said system to increase said second engine speed.

References Cited in the file of this patent

UNITED STATES PATENTS

| | | |
|---|---|---|
| Re. 21,569 | Crago | Sept. 17, 1940 |
| 1,707,296 | Brotz | Apr. 2, 1929 |
| 1,795,053 | Strong | Mar. 3, 1931 |
| 2,047,234 | Smith | July 14, 1936 |
| 2,083,612 | Midyette | June 15, 1937 |
| 2,257,915 | Newton | Oct. 7, 1941 |
| 2,266,238 | Newton | Dec. 16, 1941 |
| 2,274,153 | Miller | Feb. 24, 1942 |
| 2,282,878 | Newton | May 12, 1942 |
| 2,333,729 | Miller | Nov. 9, 1943 |

UNITED STATES PATENT OFFICE
CERTIFICATE OF CORRECTION

Patent No. 2,840,314                                                             June 24, 1958

Harold G. Haines

It is hereby certified that error appears in the printed specification of the above numbered patent requiring correction and that the said Letters Patent should read as corrected below.

Column 4, line 39, for "opposite" read -- positive --; column 5, line 26, for "serve" read -- serves --; column 7, line 25, for "disconnects" read -- disconnect --; column 9, line 68, for "decerase" read -- decrease --; line 70, for "geenrating" read -- generating --; column 12, line 40, for "power-generating" read -- energy transforming --; same line, for "power-" read -- energy --; line 41, for "power-generating" read -- energy transforming --; line 43, for "power-generating" read -- energy transforming --; line 44, for "power-" read -- energy --; line 45, for "generating" read -- transforming --.

Signed and sealed this 16th day of September 1958.

(SEAL)
Attest:

KARL H. AXLINE                                                     ROBERT C. WATSON
                                                                              Commissioner of Patents
Attesting Officer